(12) United States Patent
Vukich et al.

(10) Patent No.: US 10,510,083 B1
(45) Date of Patent: Dec. 17, 2019

(54) INACTIVE BLANK CHECKS

(71) Applicant: Capital One Services, LLC, McLean, VA (US)

(72) Inventors: Adam Vukich, Alexandria, VA (US); Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/199,890

(22) Filed: Nov. 26, 2018

(51) Int. Cl.
*G06Q 20/42* (2012.01)
*G07D 7/00* (2016.01)
*G06Q 20/04* (2012.01)

(52) U.S. Cl.
CPC ........... *G06Q 20/42* (2013.01); *G06Q 20/042* (2013.01); *G07D 7/003* (2017.05)

(58) Field of Classification Search
CPC ......... G07F 19/00; G07F 11/00; G07D 11/12; G07D 11/13; G07D 11/16; G07D 11/23; G07D 11/50
USPC ...... 235/379, 375, 487; 705/35–45; 382/135
See application file for complete search history.

(56) References Cited

U.S. PATENT DOCUMENTS

| | | | |
|---|---|---|---|
| 7,266,527 B1 | 9/2007 | Martin | |
| 8,478,744 B1* | 7/2013 | Rose | G06Q 20/042 705/35 |
| 2004/0111371 A1* | 6/2004 | Friedman | G06K 17/00 705/42 |
| 2004/0236692 A1* | 11/2004 | Sellen | G06Q 20/02 705/45 |
| 2013/0198076 A1* | 8/2013 | Zambelli Hosmer | G06Q 20/12 705/44 |
| 2013/0212008 A1* | 8/2013 | Edwards | G06Q 20/10 705/39 |
| 2015/0120548 A1* | 4/2015 | Smith | G06Q 20/407 705/44 |
| 2015/0278819 A1* | 10/2015 | Song | G06Q 20/042 705/45 |
| 2017/0132633 A1* | 5/2017 | Whitehouse | G06Q 20/3274 |

* cited by examiner

*Primary Examiner* — Edwyn Labaze
(74) *Attorney, Agent, or Firm* — DLA Piper LLP (US)

(57) ABSTRACT

The present disclosure generally relates to a system and method of verifying a banknote. A computing system receives a first request to pre-approve a banknote. The first request includes one or more visual characteristics of the banknote. The computing system receives, from a second user, a second request to deposit a circulating banknote. The second request includes a representation of the circulating banknote. The computing system identifies that an account from which the representation of the circulating banknote originated is the first user account. The computing system compares the representation of the circulating banknote to the one or more visual characteristics of the banknote stored in the first user account. The computing system determines that the representation of the circulating banknote is equivalent to the pre-activated banknote by identifying the one or more visual characteristics of the pre-activated banknote in the representation of the circulating banknote.

20 Claims, 5 Drawing Sheets

INACTIVE BLANK CHECKS

FIELD OF THE DISCLOSURE

The present disclosure generally relates to a fraud detection and a method of operating the same. In particular, the present disclosure generally relates to a system and method of verifying a banknote.

BACKGROUND

Currently, there are various means in which consumers may transact with third party vendors. Credit card products are one instrument that are offered and provided to consumers by credit card issuers (e.g., banks and other financial institutions). Banknotes, or more commonly "checks," are offered and provided to consumers by financial institutions. The banknotes allow a user associated with an account with the financial institution to transfer funds from the user's account to a third party. The user typically fills out the banknote with at least one or more of an amount to be transfer and a recipient to which the amount will be transferred.

SUMMARY

Embodiments disclosed herein generally relate to a fraud detection system and a method of operating the same. In one embodiment, a method of verifying a banknote is disclosed herein. A computing system receives, from a client device, a first request to pre-approve a banknote associated with a first user account. The first request includes one or more visual characteristics of the banknote. The computing system stores the pre-approval and the one or more visual characteristics of the banknote in the first user account. The computing system receives, from a second user, a second request to deposit a circulating banknote. The second request includes a representation of the circulating banknote. The computing system identifies that an account from which the representation of the circulating banknote originated is the first user account. The computing system compares the representation of the circulating banknote to the one or more visual characteristics of the banknote stored in the first user account. The computing system determines that the representation of the circulating banknote is equivalent to the pre-activated banknote by identifying the one or more visual characteristics of the pre-activated banknote in the representation of the circulating banknote. The computing system credits a second user account associated with funds specified on the circulating banknote and debiting funds from the first user account.

In some embodiments, the first request includes an image of the banknote. The image includes the one or more visual characteristics of the banknote.

In some embodiments, storing the one or more visual characteristics of the banknote in the first user account includes the computing system optically recognizing one or more combinations of characters illustrated on the banknote. The computing system stores the one or more combinations of characters in the first user account.

In some embodiments, the first request further includes an expiration data associated with the banknote.

In some embodiments, the computing system determines that a date of the second request is at least prior to the expiration date.

In some embodiments, the computing system receives, from a third user, a third request to deposit a second circulating banknote. The second circulating banknote includes a second representation of the second circulating banknote. The computing system identifies that the account from which the second representation of the second circulating banknote originated is the first user account. The computing system determines that there does not exist a pre-approval for the second banknote in the first user account. Based on the determination, the computing system rejects the third request.

In some embodiments, the one or more visual characteristics of the banknote includes one or more of a payee name, account number, routing number, monetary amount, and banknote number.

In another embodiment, a method of verifying a banknote is disclosed herein. A computing system receives, from a first user, a first request to pre-approve a banknote associated with a first user account. The first request includes one or more characteristics of the banknote. The computing system stores the pre-approval and the one or more characteristics of the banknote in the first user account. The computing system receives, from a second user, a second request to deposit a circulating banknote. The second request includes a representation of the circulating banknote. The computing system identifies that an account from which the representation of the circulating banknote originated is the first user account. The computing system compares the representation of the circulating banknote to the one or more characteristics of the banknote stored in the first user account. The computing system determines that the representation of the circulating banknote is not equivalent to the pre-activated banknote by identifying that the one or more visual characteristics of the pre-activated banknote are not included in the representation of the circulating banknote. The computing system rejects the second request from the second user.

In some embodiments, the first request includes an image of the banknote. The image includes the characteristics of the banknote.

In some embodiments, storing the pre-approval and the one or more characteristics of the banknote in the first user account includes the computing system optically recognizing one or more combinations of characters illustrated on the banknote. The computing system stores the one or more combinations of characters in the first user account.

In some embodiments, the first request further in an expiration data associated with the banknote.

In some embodiments, the computing system receives, from a third user, a third request to deposit a second circulating banknote. The third request includes a representation of the second circulating banknote. In some embodiments, the computing system identifies that an account from which the representation of the second circulating banknote originated is the first user account. The computing system compares the representation of the second circulating banknote to the one or more characteristics of the banknote stored in the first user account. The computing system determines that the information in the representation of the second circulating banknote does include the one or more visual characteristics of the pre-activated banknote. The computing system determines that a date of the third request is after the expiration date. The computing system rejects the second request from the second user.

In some embodiments, the computing system receives, from a third user, a third request to deposit a second circulating banknote. The third request includes representation of the second circulating banknote. The computing system identifies that an account from which the representation of the second circulating banknote originated is the first user account. The computing system compares the representation of the second circulating banknote to the one or more characteristics of the banknote stored in the first user account. The computing system determines that the information in the representation of the second circulating banknote does include the one or more visual characteristics of the pre-activated banknote. The computing system determines that a date of the third request is at least prior to the expiration date. The computing system credits a third user account associated with the funds specified on the representation of the second circulating banknote and debiting the funds from the first user account.

In some embodiments, the computing system receives, from a third user, a third request to deposit a second circulating banknote. The third request includes a representation of the second circulating banknote. The computing system identifies that an account from which the representation of the second circulating banknote originated is the first user account. The computing system compares the representation of the second circulating banknote to the one or more characteristics of the banknote stored in the first user account. The computing system determines that the information in the representation of the second circulating banknote does include the one or more visual characteristics of the pre-activated banknote. The computing system credits a third user account, associated with the third user, funds specified on the second circulating banknote and debiting the funds from the first user account.

In another embodiment, a system is disclosed herein. The system includes a processor and a memory. The memory has programming instructions stored thereon, which, when executed by the processor performs an operation. The operation includes receiving a first request, from a client device, to pre-approve a banknote associated with a first user account. The first request includes one or more visual characteristics of the banknote. The operation further includes storing the pre-approval and the one or more visual characteristics of the banknote in the first user account. The operation further includes receiving, from a second user, a second request to deposit a circulating banknote. The second request includes a representation of the circulating banknote. The operation further includes identifying that an account from which the representation of the circulating banknote originated is the first user account. The operation further includes comparing the representation of the circulating banknote to the one or more visual characteristics of the banknote stored in the first user account. The operation further includes determining that the representation of the circulating banknote is equivalent to the pre-activated banknote by identifying the one or more visual characteristics of the pre-activated banknote in the representation of the circulating banknote. The operation further includes crediting a second user account associated with funds specified on the circulating banknote and debiting funds from the first user account.

In some embodiments, the first request includes an image of the banknote. The image includes the one or more visual characteristics of the banknote.

In some embodiments, the operation of storing the one or more visual characteristics of the banknote in the first user account includes optically recognizing one or more combinations of characters illustrated on the banknote, and storing the one or more combinations of characters in the first user account.

In some embodiments, the first request further includes an expiration data associated with the banknote.

In some embodiments, the operation further includes determining that a date of the second request is at least prior to the expiration date.

In some embodiments, the operation further includes receiving, from a third user, a third request to deposit a second circulating banknote. The second circulating banknote includes a second representation of the second circulating banknote. The operation further includes identifying that the account from which the second representation of the second circulating banknote originated is the first user account. The operation further includes determining that there does not exist a pre-approval for the second banknote in the first user account. The operation further includes rejecting the third request based on the determination.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein generally relate to a fraud detection and a method of operating the same. More specifically, the present disclosure generally relates to a system and method of verifying a banknote. As stated above, banknotes are a mechanism by which a user can transfer funds from the user's account with a financial institution with a third party. At the very least, to transfer funds from the user's account to a third party, the banknote must display an amount to be transferred (e.g., funds), a name of the third party to which the funds will be transferred, and a signature of the user. As such, should a blank, incomplete (e.g., partially filled out), or filled out banknote be intercepted by a fraudulent individual, conventional techniques for banknote management were simply unable to selectively stop fraudulent individuals from obtaining the funds represented by the banknote, unless the user contacted the financial institution to place a stop order on the particular banknote that was intercepted.

The one or more techniques discussed herein address the limitations of conventional systems, by providing a mechanism by which banknotes issued by an organization to a user are, by default, inactive until a user takes the necessary steps to activate the banknote. As such, in situations in which a banknote is intercepted, a fraudulent individual will be unable to obtain the funds represented by the banknote if the banknote remains in its initial state of being inactive. The user may activate a particular banknote by providing the organization with one or more visual characteristics of the banknote. The one or more visual characteristics of the banknote may serve as one or more rules that must be satisfied when a third party attempts to obtain the funds represented by the banknote. Such system reduces the likelihood of banknotes being obtained and used by fraudulent individuals by reducing the situations in which funds represented by a banknote may be transferred.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
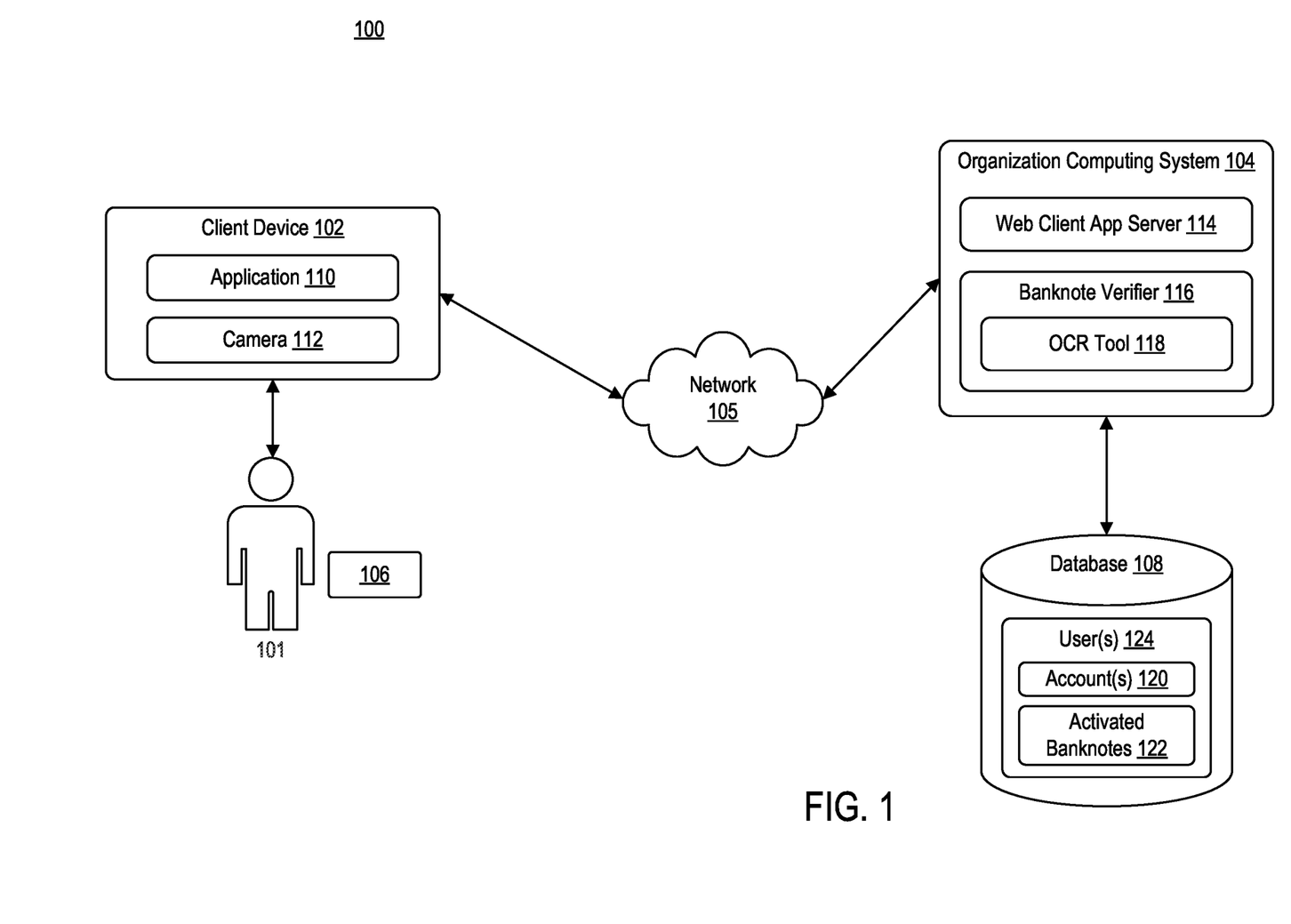
FIG. 1 is a block diagram illustrating a computing environment, according to one exemplary embodiment.

FIG. 1 is a block diagram illustrating a computing environment 100, according to one embodiment. Computing environment 100 may include at least client device 102 and organization computing system 104 communicating via network 105. In some embodiments, user 101 may operate client device 102. User 101 may have one or more banknotes 106 linked to a financial account with organization computing system 104.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Client device 102 may include at least an application 110 and a camera 112. Application 110 may be representative of a web browser that allows access to a website or a stand-alone application. Client device 102 may access application 110 to access functionality of organization computing system 104. Client device 102 may communicate over network 105 to request a webpage, for example, from web client application server 114 of organization computing system 104. For example, client device 102 may be configured to execute application 110 to access content managed by web client application server 114. The content that is displayed to client device 102 may be transmitted from web client application server 114 to client device 102, and subsequently processed by application 110 for display through a graphical user interface (GUI) of client device 102. Camera 112 may be operable by user 101 of client device 102. Camera 112 may be configured to capture an image of check 106 to be uploaded to organization computing system 104.

User 101 of client device 102 may use application 110 and/or camera 112 to pre-approve one or more banknotes. For example, organization associated with organization computing system 104 may issue inactive banknotes (e.g., banknote 106) to user 101. Inactive banknotes may correspond to a user's account with organization. In order for an intended recipient (or payee) to obtain funds represented by a given banknote, user 101 must activate (or pre-approve) the inactive banknote. User 101 may activate the inactive banknote via application 110. For example, application 110 may provide a client portal, in which users can manage activation/inactivation of one or more inactive banknotes.

User 101 may activate a banknote by transmitting to organization computing system 104 one or more visual characteristics of the banknote that uniquely identify the banknote. In some embodiments, user 101 may access one or more functionalities provide by organization computing system 104 via application 110 to provide one or more visual characteristics of banknote 106 to organization computing system 104. In some embodiments user 101 may access one or more functionalities by organization system via application 110 to upload an image of banknote 106 to organization computing system. Image of banknote 106 may visually illustrate one or more visual characteristics of banknote 106. One or more visual characteristics of banknote 106 may include, but are not limited to, an account number, a routing number, a banknote number, a payee name, a numerical amount, a recitation in a memo line of banknote 106, and the like.

In some embodiments, user 101 may activate banknote by transmitting to organization computing system 104 a text representation of one or more visual characteristics of the banknote that uniquely identify the banknote. For example, rather than transmitting an image of the banknote to organization computing system 104, user 101 may manually enter the one or more visual characteristics of the banknote (e.g., account number, routing number, banknote number, payee name, numerical amount, recitation in a memo line).

In some embodiments, user 101 may leverage a combination of image data and textual data to activate a banknote.

In some embodiments, along with the activation request of the banknote, user 101 may define a duration in which the activation of a particular banknote is valid. In other words, user 101 may set a time limit in which the recipient of the banknote must attempt to obtain funds represented by the banknote. Should the recipient of the banknote not attempt to obtain funds represented by the banknote during this duration, the banknote is no longer activated, and the recipient may be barred from obtaining the funds until user 101 re-actives the banknote.

Organization computing system 104 may include at least banknote verifier 116. Banknote verifier 116 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Banknote verifier 116 may be configured to manage the subsequent deposit of banknote 106 by third parties. Banknote verifier 116 may, for example, receive authorization to issue funds represented by banknote 106 when a pre-defined set of rules are met. Such pre-defined set of rules may include the one or more visual characteristics of banknote 106 provided by user 101 via application 110. Banknote verifier 116 may further compare incoming requests to transfer funds (e.g., deposit banknote 106) from user's 101 account to a third party's account by comparing one or more visual characteristics of a received banknote to the one or more visual characteristics defined by user 101.

In some embodiments, banknote verifier 116 may include optical character recognition (OCR) tool 118. OCR tool 118 may be configured to scan received images (from both client device 102 and a device of third party) to recognize text contained therein, such that the text can be parsed and understood by banknote verifier 116.

In some embodiments, OCR tool 118 may be specially configured to scan and recognize handwritten text (e.g., numerical amount entries and non-numerical entries). For example, OCR tool 118 may be configured to compare deciphered text in a numerical amount field (e.g., 200.00) and input in a word-based amount field (e.g., two-hundred dollars) to double-check the accuracy of the analysis.

In some embodiments, banknote verifier 116 may implement a feedback loop mechanism for use with OCR tool 118. For example, banknote verifier 116 may implement one or more feedback loops feedback loops to test the confidence in the output of OCR tool 118 by requesting the user to clarify or retry the upload process.

Organization computing system 104 may communicate with database 108. As illustrated, database 108 may include one or more user account 124 (illustrated in FIG. 1 as "user(s) 124"). Each user account 124 may correspond to a respective user of the organization associated with organization computing device 104. Each user account 124 may include one or more accounts 120 and one or more activated banknotes 122. Each account 120 may correspond to a respective financial account with the organization. For example, within user account 124 may be one or more credit card accounts and one or more debit card accounts. Activated banknotes 122 may be representative of the one or more visual characteristics communicated by user 101 for comparison when banknotes associated with an account 120 is submitted for deposit.

Figure 2:
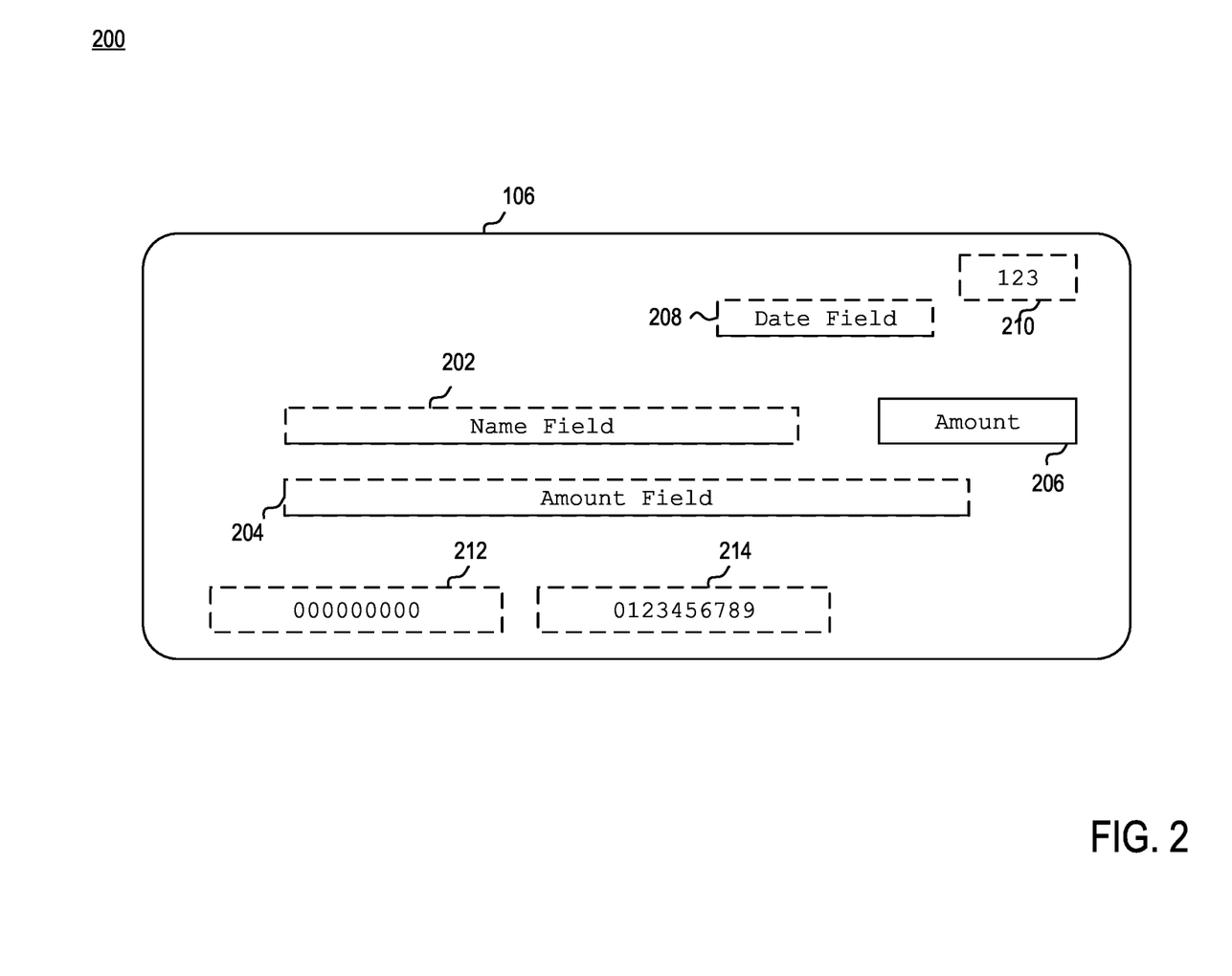
FIG. 2 is a block diagram of a banknote, according to one exemplary embodiment.

FIG. 2 is a block diagram 200 illustrating a banknote 106, according to one exemplary embodiment. Banknote 106 may include one or more visual characteristics. Banknote 106 may include a name field 202, one or more amount fields 204, 206, a date field 208, a banknote number 210, a routing number 212, and an account number 214. Name field 202 may correspond to a target payee to which user 101 intended to transfer funds. Amount field 204 may correspond to a field in which user 101 enters an amount in words to be transferred to the target payee. Amount field 206 may correspond to a field in which user 101 enters the amount in numbers to be transferred to target payee. Date field 208 may correspond to a field in which a date banknote 106 was signed is entered. Banknote number 210 may correspond to a specific numbered banknote 106 issued by organization. Routing number 212 may correspond to a numerical representation that indicates the financial institution from which banknote 106 was drawn. Account number 214 may correspond to a numerical representation that indicates the user's account (e.g., account 120) from which banknote 106 transfers funds.

When user 101 transmits one or more visual characteristics of banknote 106 that define one or more rules for allowing a subsequent deposit of banknote 106 by a third party, the one or more visual characteristics are one or more of name field 202, one or more amount fields 204, 206, date field 208, banknote number 210, routing number 212, and account number 214.

Figure 3:
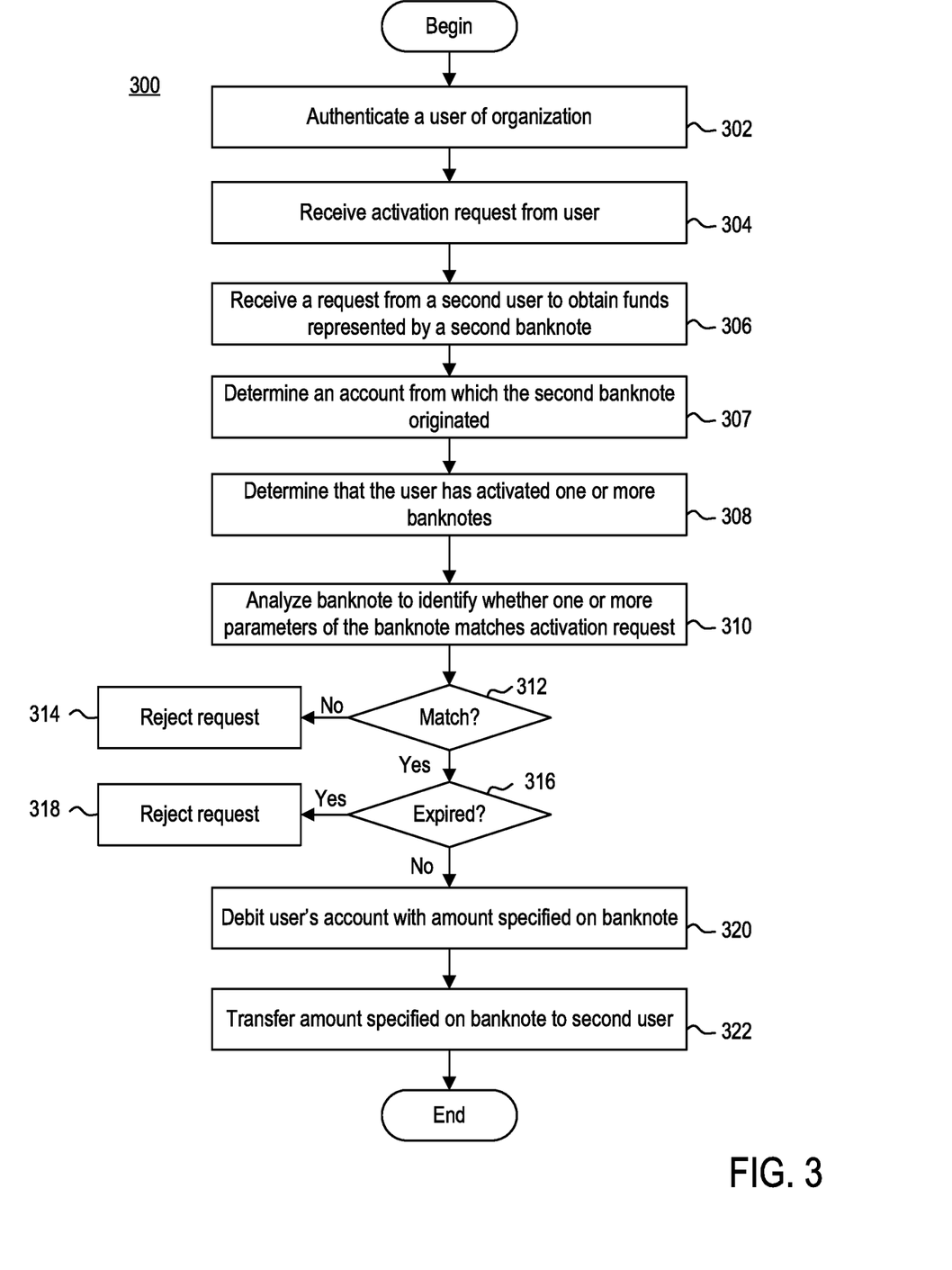
FIG. 3 is a flow diagram of a method of verifying a banknote, according to one exemplary embodiment.

FIG. 3 is a flow diagram illustrating a method 300 of verifying a banknote, according to one exemplary embodiment. Method 300 begins at step 302. At step 302, organization computing system 104 may authenticate user 101. For example, organization computing system 104 may receive an authentication request from user 101 via application 110 executing on client device 102. Organization computing system 104 may prompt user 101 to provide a user name and password to access his or her account. Organization computing system 104 may receive the user name and password from client device 102, and query database 108 with user name and password to authenticate user 101.

At step 304, organization computing system 104 may receive an activation request from client device 102. Activation request may include a request to activate a particular banknote associated with user account 124. Activation request may include one or more visual characteristics of the particular banknote. In some embodiments, the one or more visual characteristics of the particular banknote are communicated from client device 102 in a textual form. In some embodiments, the one or more visual characteristics of the particular banknote are communicated from client device 102 in an image form (i.e., user 101 uploaded an image of the particular banknote to organization computing system 104). In those embodiments in which client device 102 uploads an image of banknote to organization computing system 104, OCR tool 118 may analyze the received image to convert text portions of the image to parsable text, and upload the parsable text as one or more rules. In those situations in which the image may not be parsable (or easily parsable), the overall image may be split, and each section of the overall image may be saved as a separate image. As such, computer vision may be used to compare the section a user uploaded to a corresponding section of the banknote as it was being cashed.

At step 306, organization computing system 104 may receive a request from a second user to deposit a second banknote. In some embodiments, the request may be in the form of second user attempting to deposit the second banknote via an application on a second client device. For example, the second user may attempt to deposit the second banknote by capturing an image (or representation) of the second banknote with a camera of the second client device.

At step 307, organization computing system 104 may determine an account from which the second banknote originated. For example, OCR tool 118 may analyze second banknote to convert text portions thereof to parsable text. Banknote verifier 116 may then identify an account number contained in the second banknote based on the parsable text. Using the identified account number, banknote verifier 116 may query database 108 to determine the account 120 corresponding to the account number. In the embodiment discussed in conjunction with FIG. 3, banknote verifier 116 has determined that the account number matches an account 120 of user 101.

At step 308, organization computing system 104 may determine that user 101 has one or more activated banknotes defined in user's account 120. For example, user 101 may have defined one or more rules for one or more banknotes.

At step 310, organization computing system 104 may analyze the second banknote to identify one or more visual characteristics contained therein. For example, banknote verifier 116 may parse the parsable text in the image of the second banknote to identify the one or more visual characteristics. The one or more visual characteristics may include, for example, an account number, a routing number, a payee name, an amount of funds to be transferred, a banknote number, a banknote date, and the like.

At step 312, organization computing system 104 may determine whether there is a match between at least one of the one or more visual characteristics of the second banknote to one or more rules defined in user's account 120. For example, banknote verifier 116 may compare the one or more visual characteristics of the second banknote to one or more visual characteristics defined in user's account 120. If, at step 312, organization computing system 104 determines that there is not a match, then method 300 proceeds to step 314, and organization computing system 104 rejects the request.

If, however, at step 312, organization computing system 104 determines that there is a match, then method 300 proceeds to step 316. At step 316, organization computing system 104 determines whether the authorization to deposit the banknote has expired. For example, user 101 may predefine a duration in which a payee may be authorized to deposit funds in the banknote. Organization computing system 104 may compare the date of the second request to the date specified in user account 120.

If, at step 316, organization computing system 104 determines that the authorization to deposit the banknote has expired, then method 300 proceeds to step 318, and organization computing system 104 rejects the request. If, however, at step 316, organization computing system 104 determines that the authorization to deposit the banknote has not expired, then method 300 proceeds to step 320.

At step 320, organization computing system 104 may debit user's account with the amount specified on the banknote. At step 322, organization computing system 104 may transfer the amount specified on the banknote to an account specified by the third party.

Figure 4:
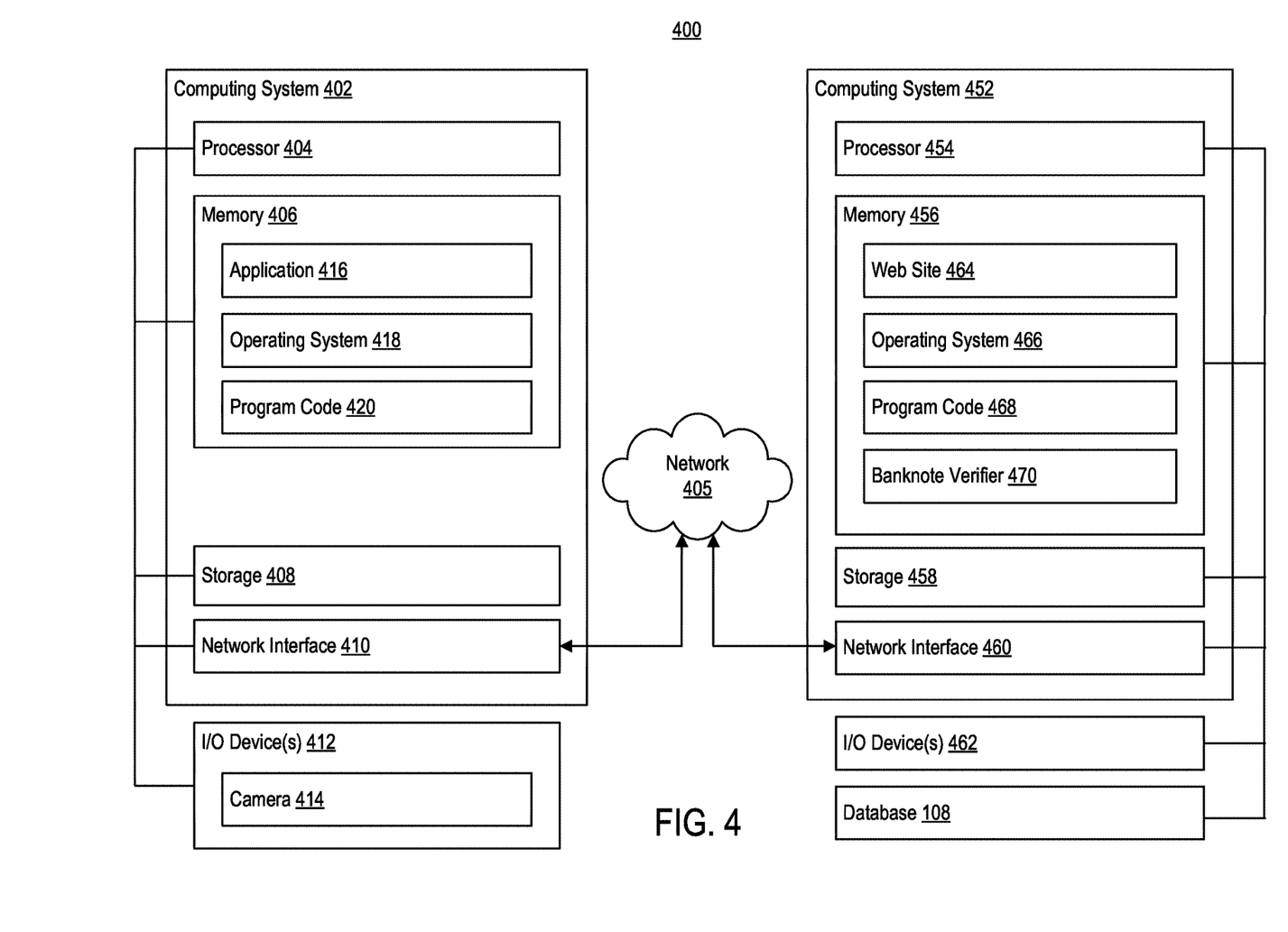
FIG. 4 is a block diagram illustrating a computing environment, according to one exemplary embodiment.

FIG. 4 is a block diagram illustrating an exemplary computing environment 400, according to some embodiments. Computing environment 400 includes computing system 402 and computing system 452. Computing system 402 may be representative of client device 102. Computing system 452 may be representative of organization computing system 104.

Computing system 402 may include a processor 404, a memory 406, a storage 408, and a network interface 410. In some embodiments, computing system 402 may be coupled to one or more I/O device(s) 412 (e.g., keyboard, mouse, etc.). One or more I/O devices 412 may include one or more cameras 414. In some embodiments, one or more cameras 414 may include a front facing camera. In some embodiments, one or more cameras 414 may include a rear facing camera. In some embodiments, one or more cameras 414 may include both a front facing camera and a rear facing camera.

Processor 404 may retrieve and execute program code 420 (i.e., programming instructions) stored in memory 406, as well as stores and retrieves application data. Processor 404 may be included to be representative of a single processor, multiple processors, a single processor having multiple processing cores, and the like. Network interface 410 may be any type of network communications allowing computing system 402 to communicate externally via computing network 405. For example, network interface 410 is configured to enable external communication with computing system 452.

Storage 408 may be, for example, a disk storage device. Although shown as a single unit, storage 408 may be a combination of fixed and/or removable storage devices, such as fixed disk drives, removable memory cards, optical storage, network attached storage (NAS), storage area network (SAN), and the like.

Memory 406 may include application 416, operating system 418, and program code 420. Program code 420 may be accessed by processor 404 for processing (i.e., executing program instructions). Program code 420 may include, for example, executable instructions for communicating with computing system 452 to provide user with one or more functionalities associated with a user's account with a financial organization. Program code 420 may also include, for example, executable instructions for allowing a user to request specific denominations in a withdrawal event.

Computing system 452 may include a processor 454, a memory 456, a storage 458, and a network interface 460. In some embodiments, computing system 452 may be coupled to one or more I/O device(s) 462. In some embodiments, computing system 452 may be in communication with database 108.

Processor 454 may retrieve and execute program code 468 (i.e., programming instructions) stored in memory 456, as well as stores and retrieves application data. Processor 454 is included to be representative of a single processor, multiple processors, a single processor having multiple processing cores, and the like. Network interface 460 may be any type of network communications enabling computing system 452 to communicate externally via computing network 405. For example, network interface 460 allows computing system 452 to communicate with computer system 402.

Storage 458 may be, for example, a disk storage device. Although shown as a single unit, storage 458 may be a combination of fixed and/or removable storage devices, such as fixed disk drives, removable memory cards, optical storage, network attached storage (NAS), storage area network (SAN), and the like.

Memory 456 may include website 464, operating system 466, program code 468, and banknote verifier 470. Program code 468 may be accessed by processor 454 for processing (i.e., executing program instructions). Program code 468 may include, for example, executable instructions configured to perform steps discussed above in conjunction with FIG. 2. As an example, processor 454 may access program code 468 to perform operations for locating a vehicle within a facility. Website 464 may be accessed by computing system 402. For example, website 464 may include content accessed by computing system 402 via a web browser or application.

Banknote verifier 470 may be configured to manage the subsequent deposit of banknote by third parties. Banknote verifier 470 may, for example, receive authorization to issue funds represented by banknote when a pre-defined set of rules are met. Such pre-defined set of rules may include the one or more visual characteristics of banknote provided by computing system 402. Banknote verifier 470 may further compare incoming requests to transfer funds (e.g., deposit banknote) from user's account to a third party's account by comparing one or more visual characteristics of a received banknote to the one or more visual characteristics defined by user.

Figure 5:
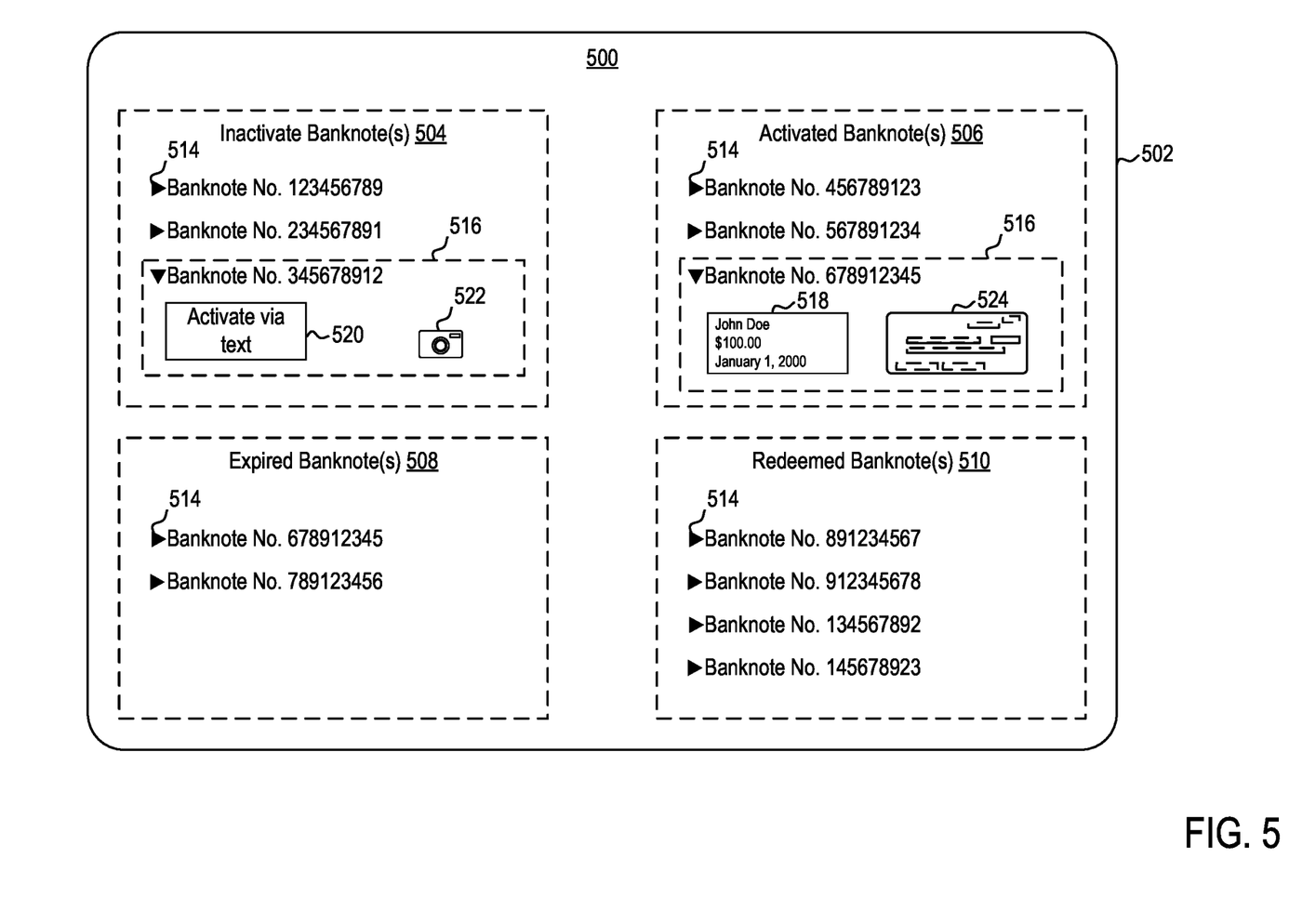
FIG. 5 is a block diagram illustrating an graphical user interface (GUI) of a client portal, according to one exemplary embodiment.

FIG. 5 is a block diagram illustrating an graphical user interface (GUI) 500 of a client portal 502, according to one exemplary embodiment. As previously discussed, application 110 may include client portal 502, which allows user 101 to manage one or more inactive (or activated) banknotes. As illustrated, client portal 502 may include a list 504 of inactive banknotes, a list 506 of activated banknotes, a list 508 of expired banknotes, and a list 510 of redeemed banknotes.

List 504 may include those inactive banknotes that user 101 has yet to activate. List 506 may include activated banknotes. In some embodiments, activated banknotes may have previously been inactive banknotes. As such, user 101 has provided one or more visual characteristics of each activated banknote to organization computing system 104, thereby activating each banknote. List 508 of expired banknotes may be representative of those banknotes for which an intended recipient failed to deposit or cash within the predefined duration. In some embodiments, list 508 of expired banknotes may be further representative of those banknotes which user has deactivated. List 510 of redeemed banknotes may correspond to those banknotes that have been previously activated (i.e., authorized) and cashed or deposited by the recipient.

As illustrated, each banknote in the lists 504-510 of banknotes may include a toggle button 514. Activating toggle button 514 may present an information window 516 that includes additional information 518 about the banknote. For example, when activated (e.g., clicked), additional information, such as the banknote number, the payee, and the amount specified on the banknote may be displayed within window 516.

For inactive banknotes 504, information window 516 may prompt user 101 to activate a respective banknote via button 520 or button 522. Button 520 may correspond to providing a textual input. Button 522 may correspond to capturing an image of the banknote.

For activated banknotes, expired banknotes 508, and redeemed banknotes 510, information window 516 may include additional information 518 about the banknote. In some embodiments, information window 516 may include an image 524 of the banknote.

Accordingly, client portal 502 provides users with an interface to manage their banknotes throughout the life of the banknote (i.e., inactive, activated, expired, redeemed).

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of verifying a banknote, comprising:
    receiving a first request, from a client device, to pre-approve a banknote associated with a first user account, the first request comprising one or more visual characteristics of the banknote;
    storing the pre-approval and the one or more visual characteristics of the banknote in the first user account by analyzing the one or more visual characteristics of the banknote and generating one or more rules corresponding to the one or more visual characteristics;
    receiving, from a second user, a second request to deposit a circulating banknote, the second request comprising a representation of the circulating banknote;
    identifying that an account from which the representation of the circulating banknote originated is the first user account;
    comparing the representation of the circulating banknote to the one or more rules corresponding to the one or more visual characteristics of the banknote stored in the first user account;
    determining that the representation of the circulating banknote is equivalent to the pre-activated banknote by identifying the one or more visual characteristics of the pre-activated banknote in the representation of the circulating banknote; and
    crediting a second user account associated with funds specified on the circulating banknote and debiting funds from the first user account.

2. The method of claim 1, wherein the first request comprising an image of the banknote comprising the one or more visual characteristics of the banknote.

3. The method of claim 1, wherein storing the one or more visual characteristics of the banknote in the first user account, comprises:
    optically recognizing one or more combinations of characters illustrated on the banknote; and
    storing the one or more combinations of characters in the first user account.

4. The method of claim 1, wherein the first request further comprises an expiration data associated with the banknote.

5. The method of claim 4, further comprising:
    determining that a of the second request is at least prior to the expiration date.

6. The method of claim 1, further comprising:
    receiving, from a third user, a third request to deposit a second circulating banknote, the second circulating banknote comprising a second representation of the second circulating banknote;
    identifying that the account from which the second representation of the second circulating banknote originated is the first user account;

determining that there does not exist a pre-approval for the second banknote in the first user account; and based on the determination, rejecting the third request.

7. The method of claim 1, wherein the one or more visual characteristics of the banknote comprises one or more of a payee name, account number, routing number, monetary amount, and banknote number.

8. A method of verifying a banknote, comprising:

receiving, from a first user, a first request to pre-approve a banknote associated with a first user account, the first request comprising one or more characteristics of the banknote;

storing the pre-approval and the one or more characteristics of the banknote in the first user account by analyzing the one or more visual characteristics of the banknote and generating one or more rules corresponding to the one or more visual characteristics;

receiving, from a second user, a second request to deposit a circulating banknote, the second request comprising a representation of the circulating banknote;

identifying that an account from which the representation of the circulating banknote originated is the first user account;

comparing the representation of the circulating banknote to the one or more rules corresponding to the one or more characteristics of the banknote stored in the first user account;

determining that the representation of the circulating banknote is not equivalent to the pre-activated banknote by identifying that the one or more visual characteristics of the pre-activated banknote are not included in the representation of the circulating banknote; and rejecting the second request from the second user.

9. The method of claim 8, wherein the first request comprises an image of the banknote comprising the characteristics of the banknote.

10. The method of claim 8, wherein storing the pre-approval and the one or more characteristics of the banknote in the first user account, comprises:

optically recognizing one or more combinations of characters illustrated on the banknote; and storing the one or more combinations of characters in the first user account.

11. The method of claim 8, wherein the first request further comprises an expiration data associated with the banknote.

12. The method of claim 11, further comprising:

receiving, from a third user, a third request to deposit a second circulating banknote, the third request comprising a representation of the second circulating banknote;

identifying that an account from which the representation of the second circulating banknote originated is the first user account;

comparing the representation of the second circulating banknote to the one or more characteristics of the banknote stored in the first user account;

determining that the information in the representation of the second circulating banknote does includes the one or more visual characteristics of the pre-activated banknote;

determining that a date of the third request is after the expiration date; and rejecting the second request from the second user.

13. The method of claim 11, further comprising:

receiving, from a third user, a third request to deposit a second circulating banknote, the third request comprising a representation of the second circulating banknote;

identifying that an account from which the representation of the second circulating banknote originated is the first user account;

comparing the representation of the second circulating banknote to the one or more characteristics of the banknote stored in the first user account;

determining that the information in the representation of the second circulating banknote does include the one or more visual characteristics of the pre-activated banknote;

determining that a date of the third request is at least prior to the expiration date; and crediting a third user account associated with the funds specified on the representation of the second circulating banknote and debiting the funds from the first user account.

14. The method of claim 8, further comprising:

receiving, from a third user, a third request to deposit a second circulating banknote, the third request comprising a representation of the second circulating banknote;

identifying that an account from which the representation of the second circulating banknote originated is the first user account;

comparing the representation of the second circulating banknote to the one or more characteristics of the banknote stored in the first user account;

determining that the information in the representation of the second circulating banknote does include the one or more visual characteristics of the pre-activated banknote; and crediting a third user account, associated with the third user, funds specified on the second circulating banknote and debiting the funds from the first user account.

15. A system, comprising:

a processor; and a memory having programming instructions stored thereon, which, when executed by the processor performs an operation, comprising:

receiving a first request, from a client device, to pre-approve a banknote associated with a first user account, the first request comprising one or more visual characteristics of the banknote;

storing the pre-approval and the one or more visual characteristics of the banknote in the first user account by analyzing the one or more visual characteristics of the banknote and generating one or more rules corresponding to the one or more visual characteristics;

receiving, from a second user, a second request to deposit a circulating banknote, the second request comprising a representation of the circulating banknote;

identifying that an account from which the representation of the circulating banknote originated is the first user account;

comparing the representation of the circulating banknote to the one or more rules corresponding to the one or more visual characteristics of the banknote stored in the first user account;

determining that the representation of the circulating banknote is equivalent to the pre-activated banknote by identifying the one or more visual characteristics of the pre-activated banknote in the representation of the circulating banknote; and crediting a second user account associated with funds specified on the circulating banknote and debiting funds from the first user account.

16. The system of claim 15, wherein the first request comprising an image of the banknote comprising the one or more visual characteristics of the banknote.

17. The system of claim 15, wherein storing the one or more visual characteristics of the banknote in the first user account, comprises:

optically recognizing one or more combinations of characters illustrated on the banknote; and storing the one or more combinations of characters in the first user account.

18. The system of claim 15, wherein the first request further comprises an expiration data associated with the banknote.

19. The system of claim 18, further comprising:

determining that a of the second request is at least prior to the expiration date.

20. The system of claim 15, further comprising:

receiving, from a third user, a third request to deposit a second circulating banknote, the second circulating banknote comprising a second representation of the second circulating banknote;

identifying that the account from which the second representation of the second circulating banknote originated is the first user account;

determining that there does not exist a pre-approval for the second banknote in the first user account; and based on the determination, rejecting the third request.

* * * * *